United States Patent [19]
Ackroff et al.

[11] Patent Number: 5,105,438
[45] Date of Patent: Apr. 14, 1992

[54] REMOTELY ACCESSING INTELLIGENT NETWORK CHANNEL TERMINATING EQUIPMENT DEVICE

[75] Inventors: John M. Ackroff, Highland Park; James C. Domangue, Metuchen, both of N.J.

[73] Assignee: AT&T Bell Laboratories, Murray Hill, N.J.

[21] Appl. No.: 625,270

[22] Filed: Dec. 10, 1990

[51] Int. Cl.$^5$ ............................................. H04B 17/00
[52] U.S. Cl. ......................................... 375/8; 375/10; 375/121; 455/64.4; 340/825.54; 379/98; 379/360
[58] Field of Search ......................... 375/8, 9, 10, 121; 370/13, 15; 371/20.1, 20.3, 20.5; 455/67; 340/505, 825.54; 379/5, 6, 28, 92, 93, 98, 352, 360; 324/527

[56] References Cited

U.S. PATENT DOCUMENTS 4,215,243 7/1980 Maxwell .............................. 379/98
4,931,250 6/1990 Greszczuk ............................ 375/8

OTHER PUBLICATIONS

The Bell System Technical Journal, Apr. 1980, pp. 501-527, "SARTS-An Overview of Remote Special-Service Testing in the Bell System".
The Bell System Technical Journal, Apr. 1980, pp. 529-556, "The Human Interface to the Switched Access Remote Test System".

*Primary Examiner*—Benedict V. Safourek
*Attorney, Agent, or Firm*—E. Weiss

[57] ABSTRACT

This invention is a method of remotely accessing an Intelligent Network Channel Terminating Equipment device to expedite the testing and servicing of telecommunications circuits.

Intelligent Network Channel Terminating Equipment devices from different manufacturers have different operating characteristics. Therefore, prior to remotely accessing and operating an Intelligent Network Channel Terminating Equipment device in a telecommunication circuit from a remote location, the operating characteristics of the device must be determined. At the heart of the invention is our recognition that Intelligent Network Channel Terminating Equipment can be categorized according to their operational characteristics and that the type of Intelligent Network Channel Terminating equipment device present at a remote location can be identified from its response to signals which are sent to the Intelligent Network Channel Terminating Equipment device.

13 Claims, 1 Drawing Sheet

REMOTELY ACCESSING INTELLIGENT NETWORK CHANNEL TERMINATING EQUIPMENT DEVICE

TECHNICAL FIELD

This invention relates generally to telecommunications circuits and more particularly to the remote control and use of an Intelligent Network Channel Termination Equipment device to service telecommunications circuits.

BACKGROUND OF THE INVENTION

Telecommunication circuits are used to connect a communication device at one location to a compatible communication device at a remote location. The communication device can be a telephone, a fax machine, a PC operating through a modem, an automated teller machine and the like. In many instances, because of the nature of the communication device and the form of the data transmitted, a communication circuit having "special" characteristics or specifications is required. These special circuits are normally referred to as being special service circuits.

There are about 150 different kinds of special service circuits, each having a different configuration and each being for different equipment at the ends. Special service circuits are used, for example, for automated teller machines, host-to-host data communications, and even for some kinds of voice circuits. Service on a given special service circuit may be provided by several carriers, as these circuits can cross LATA boundaries. Additionally, functional, geographical and regulatory considerations all contribute to the uniqueness and complexity of Special Service Circuits.

As with any telecommunication circuit, Special Service Circuits fail from time to time. When a customer reports trouble with a circuit, a test is made to determine the cause. In the regional telephone operating companies, special service test personnel use a test system called SARTS (Switched Access Remote Test System).

SARTS provides a data base of circuit configurations and other key information, and in combination with a human interface for accessing circuits, issues test commands and receives measurements. Normally the test equipment is not local to the circuit that is in trouble as it is more economical to make the test from a remotely located centralized location. A test location in Dallas, for example, can test circuits in Houston, or San Antonio, or can access and test circuits that run between Austin and El Paso.

Circuits may run over a wide geographical area and, therefore, test gear is usually made available at several different locations to help a test person localize the trouble. Testing varies in complexity, depending on where and how the test points are wired into a circuit and how the circuit operates.

For example, to decide on a strategy for testing a circuit, it is essential for the test person to know how the circuit is configured. In addition, a test measurement that represents trouble on one kind of circuit or configuration may indicate a normal condition on another circuit. Normally, special services test persons require from six to nine months to complete their training, and much of this time is spent learning about circuit configurations.

Operating in combination with SARTS is a test procedure identified as Auto-Test-2 (AT-2). AT-2 has automated the testing, analysis and disposition of circuit troubles for major circuit types and is used for both maintenance and installation testing. Basically, AT-2 runs a logical series of tests which are appropriate to the circuit type, analyzes the results, and recommends either dispatch, closeout or reference to a test person for further analysis.

Regional telephone operating companies are using equipment such as Intelligent Network Channel Terminating Equipment devices to test and service telecommunications circuits from remote locations. The Intelligent Network Channel Terminating Equipment (NCTE) devices used by the various regional telephone operating companies are made by different manufacturers and have features which are functionally identical, but are activated differently. For example, many intelligent NCTE devices support four tone alignment. But, there are three different protocols for four tone alignment. To further complicate matters, various regional telephone companies have attempted to standardize intelligent NCTE device features and operations to their own internal use without regard to the practices and procedures used by other regional telephone companies. Thus, not only are there several different specifications for intelligent NCTE devices, but various intelligent NCTE device vendors have developed specialized intelligent NCTE device features for individual regional telephone companies. For example, one regional telephone company has a specification that requires the use of a security tone to access the intelligent NCTE device. Another regional telephone company has a specification that calls for a pre-equalizer function. At least three different manufacturers build intelligent NCTE devices that meet both of the above noted specifications as well as specifications which are required by two other regional telephone companies. Additionally, all regional telephone companies have intelligent NCTE devices which, because they are early models, do not meet the current specifications, but are still being used.

Prior to testing and servicing a telecommunications circuit from a remote location, the operating characteristics of the intelligent NCTE device in the telecommunication circuit must be known. But, today, the regional telephone operating companies do not keep records of the manufacturer or the type of the NCTE device which is connected to the various telecommunications circuits. Thus, as there are no records of the type or operating characteristics of the intelligent NCTE device that is in a telecommunication circuit, it is very difficult to access an intelligent NCTE device from a remote location. Clearly, a need exists for determining from a remote location the type of intelligent NCTE device that is in the circuit.

SUMMARY OF THE INVENTION

This invention is a method of remotely determining the type of Intelligent Network Channel Terminating Equipment device coupled to a telecommunication circuit and using this information to test and/or service the telecommunication circuit. At the heart of the invention is the recognition that Intelligent NCTE devices can be categorized according to their operational characteristics and that the type of Intelligent NCTE device present at a remote location can be identified from its response to discrete signals sent to the Intelligent NCTE device.

BRIEF DESCRIPTION OF THE DRAWING

A more complete understanding of the invention can be obtained by reading the following description of a specific illustrative embodiment of the invention in conjunction with the appended drawings in which.

DETAILED DESCRIPTION

Figure 1:
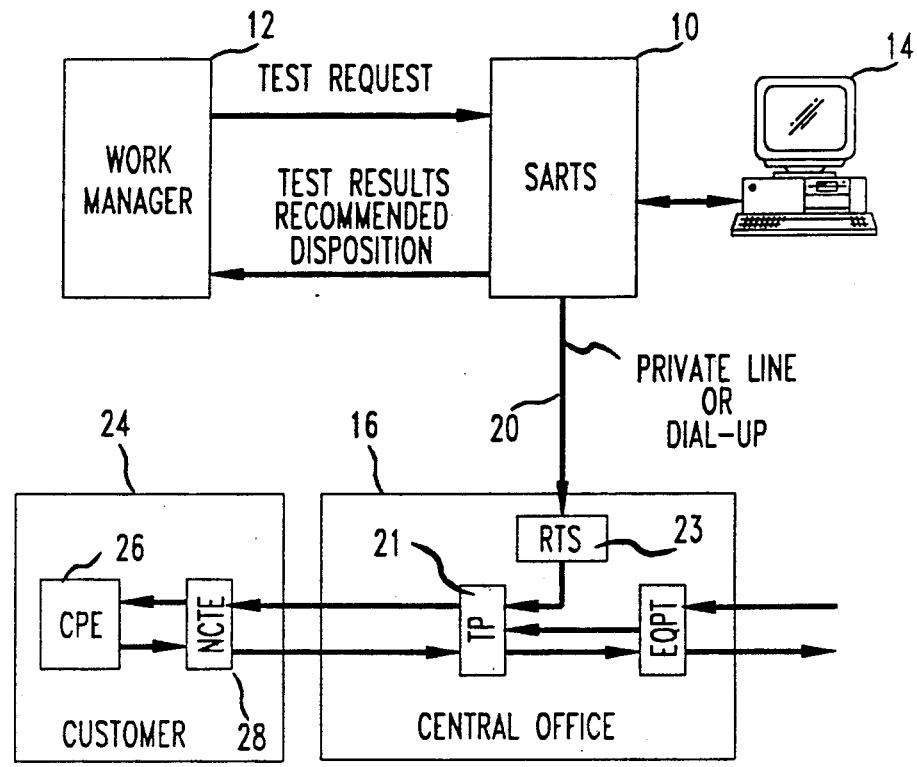
FIG. 1 is a block diagram of structure in accordance with the principles of the invention.

Referring to FIG. 1, a Switched Access Remote Test System (SARTS) 10 can be coupled to a Work Manager 12, a test station 14 which can be at a different location, and to a central office 16, via private line 20. A typical customer location 24 having customer premises equipment (CPE) 26 and an Intelligent Network Channel Terminating Equipment (NCTE) device 28 is coupled to central office 16. Located within the central office 16 are test points 21 which provide access for SARTS and a Remote Test System 23 to the various telecommunication circuits. The Remote Test System generates test tones and provides measurement capabilities.

Figure 2:
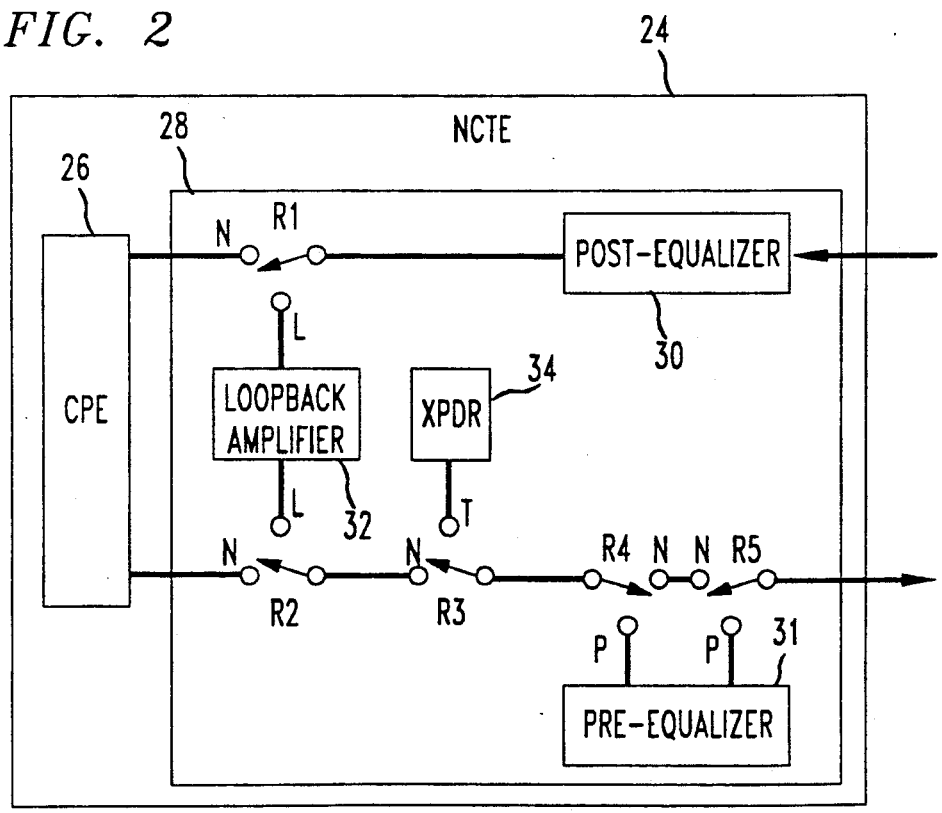
FIG. 2 is a functional diagram of the components of the intelligent NCTE device used for the remote testing and servicing of telecommunication circuits, the control circuits for analyzing the incoming signals and controlling the relays and the like not being illustrated.

A functional diagram of the components of an intelligent NCTE device used in telecommunications circuits is illustrated in FIG. 2. The NCTE device normally comprises a post-equalizer 30, a pre-equalizer 31, a loopback amplifier 32, a transponder 34, and relays R1, R2, R3, R4 and R5. During normal telecommunications operation, relays R1, R2 and R3 are operated at the position N. The incoming signal passes through post-equalizer 30 and contact N of relay R1 to a customer's premises equipment (CPE) 26. The signal from the customer's equipment to the NCTE passes through contacts N of relays R2 and R3 to relay R4 where it then passes directly to central office 16 or is sent through pre-equalizer 31 and then to the central office 16. If relays R4 and R5 are operated to the positions marked P, the signal is pre-equalized. If relays R4 and R5 are in positions N, the signal is not pre-equalized. When the intelligent NCTE is operated in its loopback mode, relays R1 and R2 are operated to the L positions and relay R3 is in the N position. The loopback amplifier 32 corrects for differences in the signal levels at which the CPE is designed to receive and transmit.

When the intelligent NCTE device is operated in its transponder mode, relay R3 is operated to the T position to couple the transponder 34 into the circuit. In this mode, the positions of relays R1 and R2 do not affect the operation of the intelligent NCTE device. To test the customer end of a telecommunication circuit, a person at the test station 14 will run a loopback test. Depending on the results of the test and other information, such as, for example, whether or not the trouble is chronic, or whether or not there is special conditioning on the circuit, and the like, the person at the test station may want to verify the frequency response of the circuit by operating the intelligent NCTE device in its loopback mode. In this mode, one or more designated frequencies are sent to the intelligent NCTE device, and the levels at which the signals are received from the intelligent NCTE device are measured. While not required, it is appropriate to perform the test using the following procedure: verify that a signal of 1004 Hz which is sent at an appropriate testing level to the intelligent NCTE device is returned at the appropriate level. With the intelligent NCTE device in its loopback mode, signals of 404 Hz, 1004 Hz, 1804 Hz and 2804 Hz are sent at an appropriate testing level. The levels of these tones are measured at the Central Office where they are received from the looped-back intelligent NCTE device. The intelligent NCTE device is then operated in its transponder mode, and the levels of the received signals are compared to those from the loopback mode. If the deviations from the level of the 1004 Hz signal are different in the transponder mode and loopback mode, the equalizer in the NCTE may not be adjusted correctly. The person at the test station then runs the alignment procedure and, thereafter, the frequency sequence in loopback mode is again run. If the response is still different from that observed in the transponder mode, the intelligent NCTE device must be manually adjusted or replaced. If the response is the same as the transponder's response, the trouble has been cleared.

Auto-Test-2 is also used to test the customer end of telecommunication circuits, using a strategy similar to that described above for the human tester. It is most advantageous for the regional telephone operating company for an automated testing application such as Auto-Test-2 to take advantage of the capabilities of intelligent NCTE devices that may be present on these circuits.

With this invention, the intelligent NCTE device is remotely activated to provide remote alignment capability. An installer can now place an intelligent NCTE device at a customer's premises and leave without waiting to work with a test person to align it. Thereafter, the test person can invoke an automated software application program to align the intelligent NCTE device and verify that the post-equalization of the signal from the intelligent NCTE device has been accomplished without having to run the test with the help of a field person.

A primary purpose of an intelligent NCTE device is to adjust the signal transmitted into the data modem to compensate for roll-off in the cable pair. A signal is considered to be equalized when it is adjusted so that the transmission level is substantially flat across the frequency spectrum. There is a distinction between post-equalization and pre-equalization of a signal. A signal is post-equalized when it is adjusted after it comes from a transmission facility (cable pair, carrier system, etc.) The signal from a post-equalizer should be flat. Alignment is the process of adjusting the post-equalizer in a NCTE device. A signal is pre-equalized when it is adjusted to compensate for the characteristics of the facility before it is transmitted into a facility. The output signal from a pre-equalizer is typically not flat and is typically used to compensate for roll-off in a cable facility. In this instance the pre-equalizer boosts the signal at the end(s) of the frequency spectrum so that a flat signal is received at the central office. Alignment also adjusts the pre-equalizer.

Normally, non-intelligent NCTE devices are aligned during installation by manually setting switches on the device. Intelligent NCTE devices can align themselves internally. With this invention, an intelligent NCTE device can be aligned from a remote location by an automated software program without knowledge of the specific type of intelligent NCTE device present in the circuit. In a disclosed embodiment, SARTS commands are used to activate an Intelligent NCTE.

An Intelligent NCTE device can measure the frequency and level of signals that are sent from a remote location such as from a Switched Access Remote Test System (SARTS). Briefly, SARTS is a computer-based, one-person, remote access and test system which is used for Special-Service Circuits. The system was designed to provide access and testing functions over a central interface normally located at a Special Service Center. For a more complete understanding of SARTS, the following material is suggested: (A) The Bell System Technical Journal, Vol. 59, No. 4, April 1980, pp. 501-527 entitled "SARTS—An Overview of Remote Special-Service Testing in the Bell System", and, (B) The Bell System Technical Journal, Vol. 59, No. 4, April 1980, pp. 529-556 entitled "The Human Interface to the Switched Access Remote Test System".

When SARTS is used for the remote alignment procedure, signals are applied at the gain slope frequencies of, for example, 1004 Hz, 2804 Hz and 404 Hz and the intelligent NCTE device uses the levels of the signals received to calculate the adjustments needed to equalize the signal.

As noted above, intelligent NCTE devices made by different manufacturer have features that are functionally identical but are activated differently. For example, many intelligent NCTE devices support four tone alignment. But, there are three different protocols for four tone alignment. To further complicated matters, various regional telephone companies have attempted to standardize intelligent NCTE features and operations to their own internal use without regard to the practices and procedures used by other regional telephone companies. Thus, not only are there several different specifications for intelligent NCTE devices, but various intelligent NCTE device vendors have developed specialized intelligent NCTE features for individual regional telephone companies. For example, one regional telephone company has a specification that requires the use of a security tone to access the intelligent NCTE. Another regional telephone company has a specification that calls for a pre-equalizer function. At least three different manufacturers build intelligent NCTE devices that meet both of the above noted specifications as well as specifications which are required by two other regional telephone companies. Additionally, all regional telephone companies have intelligent NCTE devices which, because they are early models, do not meet the current specifications but are still being used.

Intelligent NCTE devices fall into six categories arbitrarily designated as follows: Types A, B, BA, C, D and E: Type A NCTE devices support alignment only with three tones and only at 0 dBm0 or TLP. (Throughout the description TLP means operation at 0 dBm0, and DLP operation at −13 dbm0. Type A NCTE devices can be further broken down into four subcategories: A1, A2, A3 and A4 based on the transponder and pre-equalizer features. Operation of the transponder and pre-equalizer features are described below.

Type A1 NCTE devices support only alignment. There is no transponder or pre-equalizer function.

Type A2 NCTE devices support a three tone transponder function but do not pre-equalize. The transponder function is accessed by supplying a 404 Hz tone which accesses the transponder function from command mode. The procedures for entering the command mode are described below.

Type A3 NCTE devices support a three tone transponder function and are equipped with a pre-equalizer. The transponder function operates at both 0 dbm0 (TLP) and −13 dbm0 (DLP). Transponder operations at DLP and TLP are described below. While in command mode, a signal of 404 Hz activates the TLP transponder and a signal of 2804 Hz activates the DLP transponder.

Type A4 NCTE devices support a full range transponder and the pre-equalizer function. The transponder function operates at both TLP and DLP. The TLP transponder is elicited via a signal of 804 Hz, and the DLP transponder via a signal of 1304 Hz.

Type B NCTE devices support the alignment and transponder functions at both TLP and DLP. They also support four tone alignment via Type 1 alignment. Type 1, 2 and 3 four-tone alignment are described below. The nominal value of the fourth alignment tone is 1804 Hz for type B NCTE devices. The transponder function is elicited via a 404 Hz signal from command mode.

Type BA NCTE devices support four tone alignment but operate either at DLP/TLP. That is, some align and transpond only at TLP, while others align and transpond only at DLP. These NCTEs do not have a true transponder feature, but do support a test mode feature that can be used to make transmission measurements. The test mode feature is elicited from command mode via a signal of 804 Hz. This feature is described below. Type BA NCTE devices return to idle if an unexpected tone is applied for more than 15 seconds while the NCTE device is in command mode.

Type C NCTE devices support alignment and transponder functions only at TLP, but also support four tone alignment via Type 2 alignment. The nominal value of the fourth alignment tone is 1804 Hz for type C NCTE devices. For type C NCTE devices the transponder mode is elicited via a 404 Hz signal from command mode. A 2804 Hz signal from command mode causes the NCTE device to enter a sub-menu, and returns a 2804 Hz signal to its transmit pair. If a 2713 Hz tone is sent from SARTS for 10 seconds while the NCTE is in the sub-menu state, the NCTE device returns to idle mode.

Type D NCTE devices are like Type B NCTE devices in that they support the alignment and transponder functions at both DLP and TLP, and four tone alignment via Type 1 alignment. Type D NCTE devices also require the security procedure to enter command mode. The security procedure is described below. Type D NCTE devices use a signal of 1904 Hz as the nominal value of the fourth alignment and transponder frequency. As with Type B NCTE devices, transponder tones are elicited via a 404 Hz signal from command mode.

Type E NCTE devices support alignment and transponder functions only at TLP, but also support four tone alignment via Type 3 alignment. The nominal value of the fourth alignment tone is 1804 Hz for type E NCTE devices. Type E NCTE devices elicit transponder tones via a 804 Hz tone from command mode.

Clearly, from the above it is obvious that the features and the mode of operation of the various NCTE devices in use today vary significantly. Therefore, prior to operating an NCTE device from a remote location, a determination must first be made of the type of NCTE device that is connected to the circuit. In this invention, the type of NCTE device that is present is determined by an automated software program from the responses to tones that SARTS sends to the intelligent NCTE device.

Initially, the type of intelligent NCTE device in the circuit is not known. During the process of operating the intelligent NCTE device, information about the NCTE type is obtained.

The method of remotely identifying the type of intelligent NCTE device coupled to a telecommunication circuit is as follows. At the beginning of this procedure, the intelligent NCTE device should be in the idle mode. At the end of the procedure the intelligent NCTE device should be either in command mode, in which it applies a 1004 Hz command signal toward the test point, or it should be idle. Once the NCTE device is in command mode either the alignment or the transponder function can proceed.

To determine the type of NCTE device, the NCTE is first put into its command mode. There are two methods of entering command mode; the security procedure or the normal procedure. Type D NCTE devices enter the command mode via the security procedure. Other intelligent NCTE devices enter command mode via the normal procedure. The security procedure is invoked as follows: a 2713 Hz activation tone is applied at 0 dbm0 for 3 seconds and the 2713 Hz tone is immediately followed by a 2413 Hz tone applied for 15 seconds. The tone returned from the NCTE is then measured. If the 1004 Hz command tone is returned, the NCTE is a type D NCTE device, and the NCTE is in command mode. The 2413 Hz tone is removed and the procedure is complete. If the 1004 Hz tone is not returned, the 2413 Hz tone is removed and a 2713 Hz tone is applied for 10 seconds to return the intelligent NCTE device to idle. The 2713 Hz tone is then removed. The normal procedure is then used to put the intelligent NCTE device in command mode. The normal procedure consists of applying the 2713 Hz activation tone for 30 seconds. The frequency and level of the 1004 Hz tone returned from the intelligent NCTE device is measured to confirm that the NCTE device is in command mode. After it is confirmed that the NCTE device is in command mode a 2804 Hz tone at 0 dbm0 is sent to the NCTE device for 20 seconds and is then removed. The response of the NCTE device is checked for the following six cases.

1. If the NCTE device returns a 2804 Hz signal, the NCTE is a type C device and the 2804 Hz signal from SARTS activates the NCTE device to enter a submenu state. A 2713 Hz tone is then sent from SARTS at 0 dBm0 to return the NCTE device to idle. The 2713 Hz signal is then removed.
2. If the command signal decreases by 13 dB, the NCTE device is a type B and is now toggled to its DLP operation. The NCTE device is in command mode and the procedure is complete.
3. If the command signal increases by 13 dB, the NCTE device is a type B and is now toggled to TLP operation. The NCTE device is in command mode and the procedure is complete.
4. If the NCTE device goes into quiet termination, that is, no signal is returned from the device, it is either a type A3 that has entered DLP transponder mode or it is a type BA that is idle.

To determine whether the NCTE device is a type A3 or BA, a 1004 Hz signal is sent at 0dBm0 and the signal that the NCTE device returns is measured.
   a) If the NCTE device returns the command signal, the NCTE device is in its DLP transponder mode. A 2713 Hz signal at 0 dbm0 is sent to return the intelligent NCTE device to idle. The 2713 Hz tone is then removed. The intelligent NCTE device is a type A3. The procedure is then complete.
   b) If the command tone is not returned, the intelligent NCTE device is a type BA and has returned to idle. The procedure is complete.
5. If the command tone does not change, that is if the frequency and level are the same as previously measured, then the NCTE is a type A or a type E device. A 604 Hz tone is sent to start four tone alignment for type E NCTE devices. (This is the type 3 alignment procedure discussed above.) Thereafter, an attempt is made to measure an 1804 Hz signal return from the intelligent NCTE device.
   a) If the 1804 Hz signal is detected, an 1804 Hz signal is returned to the NCTE device at 0dBm0 to put the NCTE back into command mode. The NCTE is a type E device. A 2713 Hz tone is applied to return the NCTE device to idle. The 2713 Hz tone is then removed. The procedure is complete.
   b) If the command tone is still present, a 404 Hz signal is sent at 0dBm0.
      i) If the 1004 Hz command signal is no longer present, the NCTE device is a type A2 device. A 2713 Hz signal is sent at 0dBm0 to return the NCTE to idle. The procedure is complete.
      ii) If the 1004 Hz command signal is still present, a 1304 Hz signal is sent at 0dBm0. If the 1004 Hz command tone is still present, then the NCTE is an A1. The procedure is complete. If the 1004 Hz command tone is no longer present, the NCTE is a type A4 device. A 2713 Hz tone at 0dBm0 is sent to return the NCTE device to command mode. The 2713 Hz tone is then removed. The procedure is complete.

Having remotely identified the operating characteristic of the intelligent NCTE device from a remote location with signals sent to and received from the intelligent NCTE device, the test person can now remotely condition the intelligent NCTE device for alignment and/or transponder operation.

The basic procedure for conditioning an intelligent NCTE device to provide remote alignment is as follows: Put the intelligent NCTE device into the Command Mode; Execute the Swap Tone Sequence; Take Loopback Measurements; and, Return the intelligent NCTE device to Idle and Calculate the Alignment Results. The following relates to the three-tone Alignment Procedure. First, the intelligent NCTE device is placed in the command mode. If the procedure to determine the NCTE type was already involved and the NCTE device was determined to be a type A1, A4, B or D, the NCTE will already be in command mode. Otherwise, the normal command mode procedure as described above is used to put the intelligent NCTE device in the command mode. Once the NCTE device is in its command mode, the Swap Tone Sequence is executed. The level of the 1004 Hz alignment signal (the command tone) is measured and is saved. A 1004 Hz tone is applied from SARTS to the intelligent NCTE device. The intelligent NCTE device then measures the 1004 Hz tone from SARTS and responds in one of two ways. For most intelligent NCTE devices, the NCTE applies a 2804 Hz tone. This signal is measured by SARTS and the level is saved. For some type B NCTE devices, the alignment function is secured and additional steps are needed to cause the intelligent NCTE device to proceed with the swap tone sequence. In this case, when the NCTE device detects the 1004 Hz tone from SARTS, it returns a 2050 Hz security violation signal for 15 seconds. If this occurs, a 2004 Hz security override tone is applied from SARTS for 15 seconds. The NCTE then applies a 350 Hz accept tone for 15 seconds followed by the 1004 Hz command tone. The 1004 Hz tone is then reapplied from SARTS and the intelligent NCTE device then measures the 1004 Hz tone out from SARTS and returns a 2804 Hz tone. Once the 2804 Hz tone is detected by SARTS, a 2804 Hz tone is sent from SARTS toward the NCTE. The intelligent NCTE device then measures the 2804 tone from SARTS and send a 404 Hz tone. The level of this tone is measured by SARTS and saved. A 404 Hz tone is then applied toward the intelligent NCTE device. The intelligent NCTE device measures the 404 Hz tone from SARTS.

At this time the intelligent NCTE device uses the measured levels of the tones sent to it from SARTS to adjust the alignment settings internally so that the signal is equalized. The intelligent NCTE device then goes into its loopback mode. Once the intelligent NCTE is in loopback, SARTS sends and measures tones at the same three gain slope frequencies. After the loopback measurements are taken, a 2713 Hz tone is applied to return the intelligent NCTE device to idle. For type A4 C and D NCTE devices, the 2713 Hz tone causes the intelligent NCTE device to return to command mode. SARTS measures to see if the 1004 Hz command tone reappears. If so, the 2713 Hz tone is removed and reapplied to return the NCTE to idle. The measured alignment and loopback levels are compared to confirm that alignment was successful.

There are two major variations to the basic alignment sequence: four tone alignment and optional DLP/TLP alignment.

The four tone alignment procedure is required because some intelligent NCTE devices can align to four tones. The nominal tone of the fourth signal is usually 1804 Hz, but for one type of intelligent NCTE device (Type D) it is 1904 Hz. There are three ways that the intelligent NCTE device can use the fourth tone in the alignment procedure. For convenience, these will be referred to as Type 1, 2, and 3 alignment.

In Type 1 Alignment, when, at the end of the swap signal sequence SARTS applies a 404 Hz tone to the NCTE device, the NCTE generates the fourth alignment tone, either 1804 Hz or 1904 Hz. SARTS must now apply the fourth alignment tone to the NCTE device thereby causing the intelligent NCTE device to align with four tones. Alternatively, SARTS can opt for three tone alignment. If the NCTE does not receive the fourth alignment tone or if it receives a 1004 Hz tone, it aligns with three tones. Whether the intelligent NCTE device aligns with three or four tones, it goes into loopback mode after it internally computes the alignment settings.

For Type 2 alignment, the fourth tone is hidden. Three tone alignment is done as usual. If four tone alignment is desired, the swap tone sequence changes. At the point where SARTS would send the 404 Hz tone, an 1804 Hz tone is sent instead. The NCTE detects the fourth tone and sends an 1804 Hz tone. SARTS then measures the level of the 1804 Hz tone and saves the result. SARTS now sends a 404 Hz tone to the intelligent NCTE device. The NCTE device then calculates the alignment settings and goes into loopback.

For Type 3 alignment, the fourth tone is requested at the beginning of the swap signal sequence. While the NCTE is in command mode, SARTS sends a 604 Hz tone to the intelligent NCTE device. When the NCTE detects the 604 Hz tone, it generates an 1804 Hz tone. SARTS now returns an 1804 Hz tone. When the NCTE detects the 1804 Hz tone, it returns to command mode tone and reapplies the 1004 Hz tone. From this point, the alignment procedure is the same as for three tone alignment. The intelligent NCTE device calculates the alignment based on three or four tones after the swap tone sequence.

When any of these four tone alignment procedures are used, four tones are also sent from SARTS and measured while the intelligent NCTE device is in loopback mode so the alignment calculations can be done for four tones.

Type A, C, E and some BA NCTE devices send alignment tones at 0 dbm0 (transmission level point) only. These NCTE devices expect the frequencies of the tones that SARTS sends to the intelligent NCTE device to be applied at 0 dbm0 and they base the internal alingment calculations on that assumption. Some type BA NCTE devices align only at $-13$ dbm0 (data level point); that is, these NCTE devices apply tones at $-13$ dbm0 and expect the tones sent from SARTS to be applies at $-13$ dbm0. If the NCTE is a type BA, it is necessary to determine whether the NCTE operates at 0 dbm0 or $-13$ dbm0. This determination is made by comparing the level of the 1004 Hz command tone received from the NCTE device to the value of the transmission level point (TLP). A comparison value is calculated by subtracting 6.5 db from the TLP. If the level received is equal to or greater than the comparison value the device is assumed to operate at TLP and the alignment tones are sent from SARTS at 0 dbm0. If the level received is less than the comparison value the device is assumed to operate at DLP and the tones are sent from SARTS at $-13$ dbm0.

Type B and D NCTE devices support both DLP and TLP alignment; that is, they can operate at either 0 dbm0 or $-13$ dbm0 and they can be toggled between DLP and TLP from command mode. To change the intelligent NCTE device from DLP to TLP or from TLP to DLP, the NCTE device must first be put into its command mode. While the NCTE is sending the command tone, a 2804 Hz tone is sent to the NCTE device. The level of the command tone either increases or increases by 13 db. The intelligent NCTE device can be toggled back to its original state by removing and reapplying the 2804 Hz tone. SARTS can then align the NCTE with three or four tones.

For intelligent NCTE devices equipped with the DLP/TLP toggle feature, the choice of alignment at 0 dbm0 or $-13$ dbm0 has no effect on the operation of the NCTE device when it is idle or when it is in loopback mode. The adjustments to equalize the signal are the same whether the circuit was aligned in TLP mode or DLP mode. & The transponder measurements coupled with loopback measurements provide for more extensive transmission testing. When this function is exercised the NCTE sends signals, which can then be measured via SARTS so that transmission faults can be sectionalized.

The basic procedure to elicit transponder signals remotely from an intelligent NCTE device consists of four steps as follows:
1. Put the intelligent NCTE device in Command Mode.
2. Put the intelligent NCTE device in Transponder Mode.

3. Take Transponder Measurements.
4. Return the intelligent NCTE device to Idle and Calculate Test Results.

For Three tone Transponder Procedure, the NCTE device is put in command mode. The procedures for putting an intelligent NCTE device in command mode are the same as those discussed above.

Once the NCTE device is in command mode, it must be put into transponder mode. This is done by sending a "transponder signal" to the NCTE device. The frequency of the transponder signal varies depending on the type of NCTE device, and, whether DLP or TLP transponder is desired. Frequencies that are used to TLP transponder signals are 404 Hz and 804 Hz. DLP transponder can be signaled by 404 Hz, 1304 Hz or 2804 Hz.

Once the intelligent NCTE device is in transponder mode, SARTS elicits transponder signals at the three gain slope tones and measures the levels of those signals. Tones are sent from SARTS at each of the three gain slope frequencies. When the NCTE detects a tone sent from SARTS it returns a tone at the same nominal frequency. For example, if a 1004 Hz tone is sent from SARTS, a tone with a nominal frequency of 1004 Hz will be returned by the NCTE and the frequency and level of the tone returned from the NCTE will be measured via SARTS. This is repeated for tones at 404 Hz and 2804 Hz. The measurements differ from those taken in loopback mode because the signals originate from the intelligent NCTE device itself. The levels may differ because loopback measurements are affected by transmission characteristics of both the transmit and receive pairs. The transponder signal measurements are affected only by the characteristics on the intelligent NCTE device transmit pair and the post-equalization applied by the NCTE device. The frequencies of the measured signals can also differ from those generated by SARTS because the transponder signals are generated by the NCTE device. After the transponder signal measurements are taken, a 2713 Hz signal is applied to return the NCTE to idle. The transponder and loopback level measurements are compared to test for transmission faults.

There are two major variations of the transponder function: four-tone transponder and optional DLP/TLP transponder.

Type A4, B, C, D, and E NCTE devices are capable of transponding at four tones. Dome of these in fact can transpond at more than four tones. As is the case for the alignment function, the nominal frequency of the fourth tone is 1804 Hz with the exception of type D NCTE deivces, for which the nominal frequency of the fourth tone is 1904 Hz.

As noted above, Type B and D NCTE devices can align in either TLP of DLP mode. The intelligent NCTE device can be toggled between DLP and TLP from command mode via a 2804 Hz signal applied to the NCTE device. These NCTE devices also support transponder operation at both DLP and TLP. The DLP/TLP toggle changes the level for both alignment and transponder operation. These NCTE devices can be put in transponder mode via a 404 Hz tone applied while the NCTE device is in command mode. The transponder responds at 0 dbm0 or −13 dbm0 depending on the current state of the DLP/TLP toggle.

Type A3 and A4 NCTE devices align only at 0 dbm0, but provide transponder function at both −13 dbm0 and 0 dbm0. For these NCTE devices, different tones applied in command mode are used to elicit DLP transponder and TLP transponder. For example, for type A3 NCTE devices, TLP transponder is elicited via a 404 Hz tone and DLP transponder via a 2804 Hz tone. For type A4 NCTE devices the tones are 804 Hz and 1304 Hz, respectively.

There are also intelligent NCTE devices that support only TLP transponder. For type A2, C and E NCTE devices the transponder function is elicited via a 404 Hz tone. For type E NCTE devices it is elicited via an 804 Hz tone.

Type BA NCTE devices do not have a true transponder feature, but do provide a test mode feature that allows for transmission testing. This feature is activated from command mode by applying an 804 Hz tone to the NCTE device. When the 804 Hz tone is detected by the NCTE device, it applies a quiet termination. When the 804 Hz tone is removed, the intelligent NCTE device sends four tones (1014 Hz, 2814 Hz, 414 Hz and 1814 Hz) so that level measurements can be made for each of the four gain slope tones. Each tone is applied for 60 seconds. This is followed by a reapplication of quiet termination after which the NCTE device goes into loopback. At this point the tone sequence can be repeated by reading the 804 Hz from SARTS. The NCTE device returns to idle if a 2713 Hz tone is sent from SARTS. As noted above, some type BA NCTE devices operate only at 0 dbm0 and others operate only at −13 dbm0. As with the alignment function, it is necessary to determine for type BA NCTE device whether the device is operating at TLP or DLP to determine whether the tones sent in the test mode are being sent at 0 dbm0 or −13 dbm0. This is done in the same manner as described above for alignment.

A primary function of an intelligent NCTE device is to adjust the signal into the customer equipment so that it is post-equalized. The signal from the NCTE device must also be qualied to compensate for cable roll-off. Usually, the signal is post-equalized in central office equipment; however, there are cases where the signal is pre-equalized in the intelligent NCTE device. Some NCTE device specifications specifically call for a pre-equalization feature that can be enable or disabled. Type A3 and A4 NCTE devices have this feature. When pre-equalization is enabled, the adjustments that are applied to the signal into the customer equipment are also applied to the signal from the NCTE device toward the central office. Thus, the signal that arrives at the central office should be equalized.

For type A3 and A4 NCTE devices the signals sent from the NCTE device during alignment are not pre-equalized. The transponder signals may or may not be pre-equalized. As noted above, both type A3 and A4 NCTE devices can transpond either at TLP or DLP. If the TLP transponder is exercised, the signals are not pre-equalized because the compensation added to the 2804 Hz and/or 404 Hz tones might exceed the level that the NCTE device is capable of sending. If the DLP transponder is exercised and the pre-equalizer is enabled, the NCTE device sends pre-equalized signals.

Type BA NCTE devices also come equipped with a pre-equalizer that can be enabled only during the alignment procedure. If the pre-equalizer is enabled, the signals transmitted via the four-tone sweep are pre-equalized. If it is disabled, the signals are not pre-equalized.

The intelligent NCTE can be used to perform transmission analyses to determine whether or not a circuit has been properly aligned to compensate for the attenuation distortion characteristics of end loop cables. The cables used for telecommunications circuits often impose more loss at high frequencies than at lower frequencies; and, equalizers are normally placed at various points in the circuit to compensate for this by flattening the signal. The result of this is that the chracteristics of the signal received at each test point must be known in order to interpret these signals and to know at what levels to transmit the tones to perform transmission analysis. Briefly, inter-office or mid-circuit test points, as opposed to end test points, are typically situated such that they receive equalized signals in each direction. The transmission test can be performed by sending all tones at the same level in either direction. The tones should all be received at the same level regardless of whether loopback (LBK) or straightaway (CONT) tests are performed. Each test points, however, typically receive equalized (flat) signals from the interoffice facility on one side, but un-equalized (non-flat) signals from the cable pair. This being the case, transmission measurements performed through the cable pairs and loopback device are made by sending all tones at equal levels (corresponding to what is received from the inter-office facility), but tones sent into the inter-office facility should be sent at different levels corresponding to the roll-off in the cable facility. Signals sent at equal levels from an end test point with direct metallic access through a loopback device are received at unequal levels, and tones sent at the correct unequal levels through an inter-office facility are received at the far end test point at equal levels.

When the far end is tested, the tones should be sent at the same levels received from the near end NCTE device since the channel unit has been equalized to compensate for the roll-off in the cable pair. A method of performing the far-end loopback test is to send tones at equal levels and correct the received levels for the roll-off in the near-end cable pair behind the test point.

The method used for far-end testing can also be used for inter-office transmission continuity testing. Tones sent into an inter-office facility from an end test point should be sent at unequal levels to compensate for the roll-off in the cable pairs behind it, but the test can also be made by sending equal levels and correcting the received levels at the other end. Tones sent from a mid-circuit test point should be sent at equal levels with no correction needed, since tones arriving at inter-office test points should always be flat.

What is claimed is:

1. A method of identifying from a remote location a type of intelligent NCTE device from a group of intelligent NCTE devices comprising type A, B, BA, C, D and E having diverse operating characteristics present at the end of a telecommunication circuit, said method comprising the steps of sending a signal from said remote location to said intelligent NCTE device to set said intelligent NCTE device at the end of the circuit into a command mode causing said NCTE device to send a command signal of 1004 Hz toward said remote location sending to said NCTE device a signal of 2804 Hz causing said NCTE device to generate a respond signal, and identifying the type of intelligent NCTE device present at the end of the circuit from the final respond signal sent from the intelligent NCTE device at the remote location.

2. The method of claim 1 further comprising
identifying said intelligent NCTE device as being type A or type E when said final respond signal is of constant frequency and level.

3. The method of claim 2 further comprising the step of
sending a signal of 604 Hz to the NCTE device, and
identifying said NCTE device as being a type A when the final respond signal of 1804 Hz is not sent by said NCTE device.

4. The method of claim 2 further comprising the steps of
sending a tone of 604 Hz to the NCTE device, and
identifying said NCTE device as being a type E when the final respond signal of 1804 Hz is sent by the NCTE device.

5. The method of claim 1 wherein
the final respond signal from said NCTE device has a tone of 1004 Hz and has a change of level of 13 dB to identify said NCTE device as being a type B.

6. The method of claim 1 wherein
a final respond signal of 2804 Hz identifies said NCTE device as being type C.

7. The method of claim 1 further comprising the step of sending to said NCTE device a signal of 1304 Hz after sending the signal of 2804 Hz, and
identifying said NCTE device as being a type A1 if said final respond signal of 1004 Hz is still present.

8. The method of claim 1 further comprising the step of sending to said NCTE device a signal of 1304 Hz after sending the signal of 2804 Hz, and
identifying said NCTE device as being a type A4 if said final respond signal of 1004 Hz is not present.

9. The method of claim 1 wherein
the NCTE device sends no final respond signal to identify said NCTE as being a type A3 or a type BA,
sending a tone of 1004 Hz, and
identifying said NCTE device as being a type A3 when a signal of 1004 Hz is sent by said NCTE device.

10. The method of claim 1 wherein said method further comprises
sending a signal of 2713 Hz to said NCTE device,
removing and again sending the signal of 2713 Hz, and
identifying said NCTE device as being a type BA when the final respond signal of 1004 Hz is not sent by the NCTE.

11. The method of claim 1 further comprising the steps of
applying a signal of 2713 Hz to said identified NCTE device to set said identified NCTE device to its command mode and activating said NCTE device to generate a first signal having a first tone of 1004 Hz and measuring the level of said first signal,
applying a second signal at said first tone of 1004 Hz to said NCTE device and measuring the level of said second signal,
causing said NCTE device to generate a third signal having a second tone of 2804 Hz and measuring the level of said third signal,
applying a fourth signal at said second tone of 2804 Hz to said NCTE device and measuring the level of said fourth signal, causing said NCTE device to generate a fifth signal having a third tone of 404 Hz and measuring the level of said fifth signal, applying a sixth signal at said third tone of 404 Hz to said NCTE and measuring the level of said sixth signal, and using the three measured levels of said signals to determine if the alignment setting of the identified NCTE is correct.

12. The method of claim 1 further comprising sending a transponder signal to said NCTE device to set said NCTE device to its transponder mode, sending signals of equal levels in place of signals of unequal levels corrected for roll-off from said NCTE device along a circuit to a far end test point, detecting said signals at the far end test point, and correcting the levels of said detected signals to reflect the differences between the levels of the signals of equal levels relative to the signals of unequal levels corrected for roll-off.

13. A method of identifying from a remote location a type of intelligent NCTE device from a group of intelligent NCTE devices comprising type A, B, BA, C, D, and E having diverse operating characteristics present at the end of a telecommunication circuit, said method comprising the steps of sending a signal of 2713 Hz followed by a signal of 2413 Hz from said remote location to said intelligent NCTE device at the end of the circuit, checking the signal from the intelligent NCTE, identifying the NCTE device as being a type D if the signal from the intelligent NCTE device is 1004 Hz.

* * * * *